Jan. 31, 1928.  
K. E. PEILER  
1,657,640  
METHOD AND APPARATUS FOR FEEDING MOLTEN GLASS  
Filed Aug. 29, 1925  2 Sheets-Sheet 1

Inventor:  
Karl E. Peiler  
By Robson D. Brown  
Att'y.

Jan. 31, 1928.
K. E. PEILER
1,657,640
METHOD AND APPARATUS FOR FEEDING MOLTEN GLASS
Filed Aug. 29, 1925   2 Sheets-Sheet 2
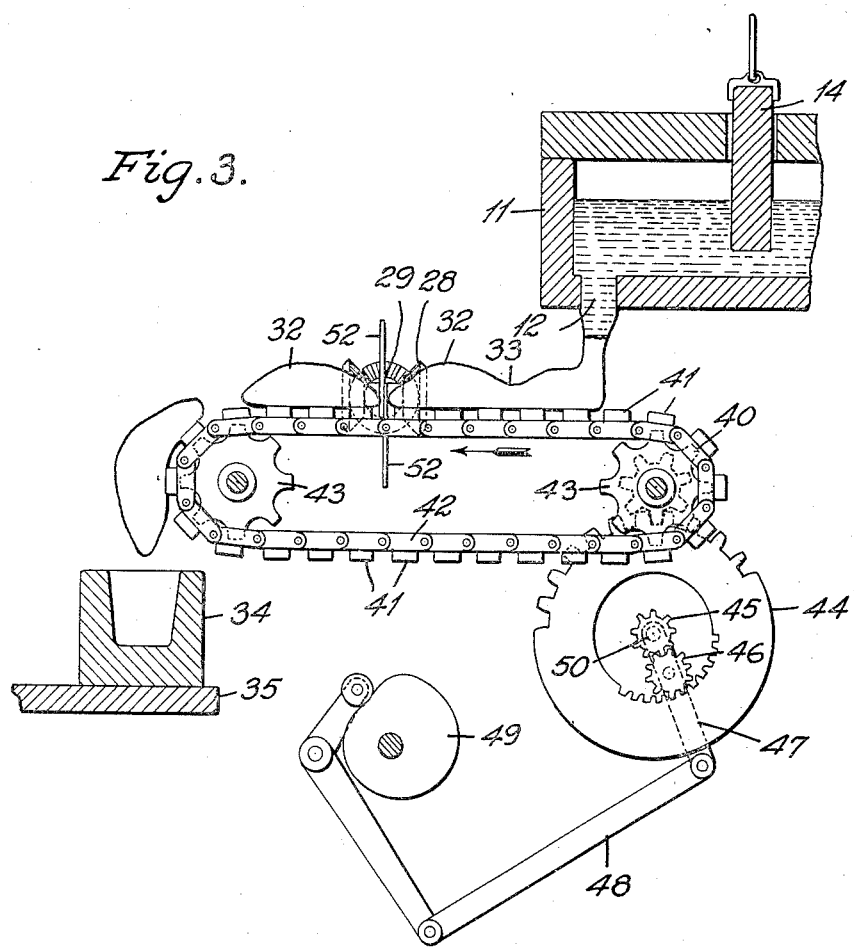
Fig. 3.
Fig. 4.
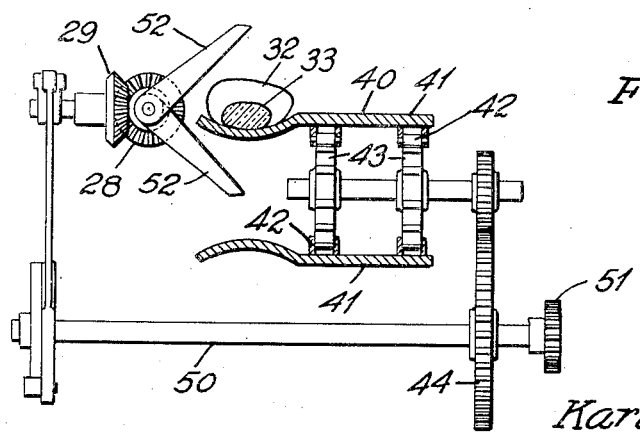
Inventor:
Karl E. Peiler
by Robson A. Brown
Att'y Patented Jan. 31, 1928.

1,657,640

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR FEEDING MOLTEN GLASS.

Application filed August 29, 1925. Serial No. 53,418.

My invention relates to the art of separating molten glass into mold charges and more particularly to that system of glass feeding wherein a continuous stream of glass is caused to issue from the discharge outlet of a tank forehearth or other container, and is delivered in mold charges of desired size to the molds of a glassware shaping machine.

The object of my invention is to provide a method and apparatus for forming mold charges by depositing a continuous supply of molten glass on a receiver, and severing the deposited glass, while on the receiver, into mold charges of the desired size. In the illustrated embodiments of the invention, this object is accomplished by discharging a continuous stream of glass from the outlet of a container on a movable receiver having a motion adapted to form the deposit of glass into a series of charges having periodically varying cross sectional areas, and severing the charges at the smaller sections to form mold charges. The receiver may have an intermittent motion, as illustrated in Fig. 1, or a periodically varying motion, as illustrated in Fig. 3. As the glass is deposited, the change in motion of the receiver causes the deposit of glass to be periodically drawn out or reduced in cross section by each successive movement or acceleration of the receiver. The several mold charges thus formed are severed by shears operated in timed relation with the motion of the receiver, and thus mold charges of the desired size may be readily formed and delivered to the molds of a glassware shaping machine.

In the drawings,

Fig. 3 is a view in elevation showing a modification of the invention;

Fig. 4 is a view in elevation, partially in section, of the apparatus shown in Fig. 3.

Figure 1:
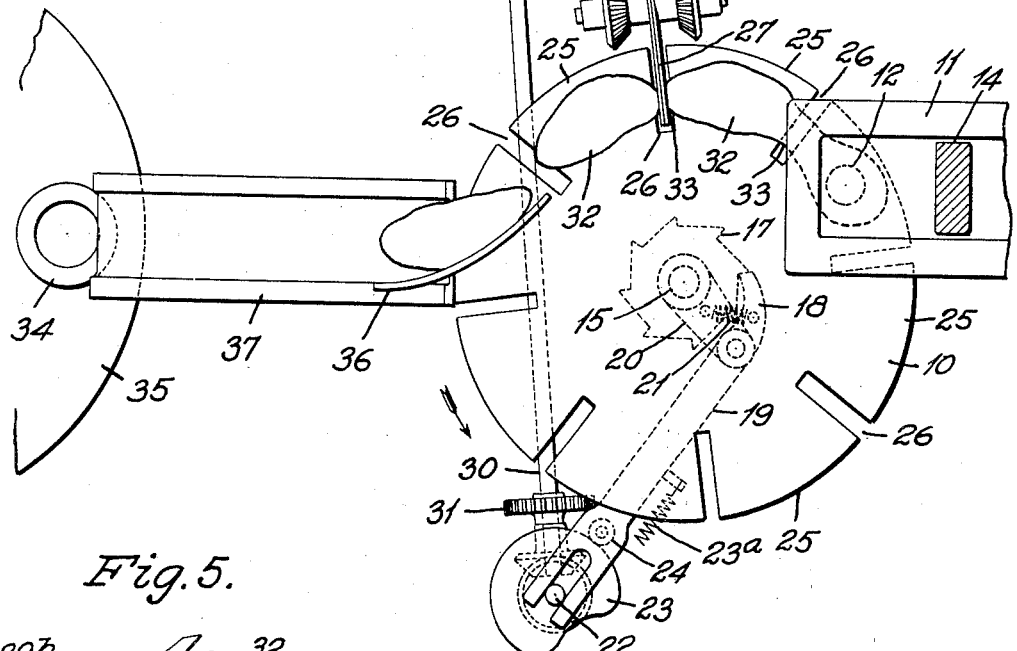
Figure 1 is a plan view of a glass feeder embodying the invention.
Figure 5:
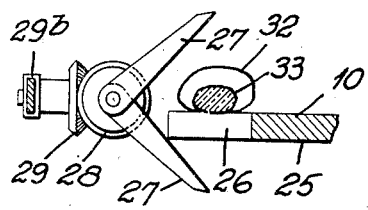
Fig. 5 is a detail view of the shearing mechanism.
Figure 2:
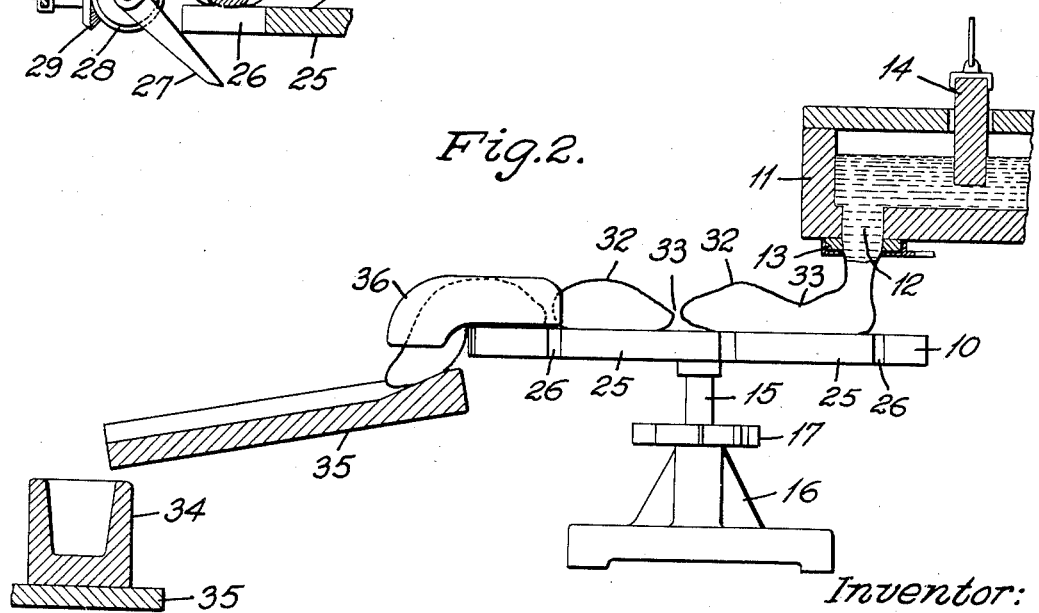
Fig. 2 is a view in elevation, partially in section, of the apparatus shown in Fig. 1.

Referring to Figs. 1 and 2 of the drawings, there is shown a device constructed in accordance with my invention, in which the numeral 10 indicates a movable receiver or support adapted to receive the deposit of glass while it is being formed into mold charges. The receiver is illustrated as a circular table having a flat receiving surface and adapted to be intermittently rotated, but it is obvious that any suitable support may be employed, as, for example, an endless conveyor, as illustrated in Fig. 3.

In practicing the invention, glass is supplied to the intermittently operated receiver 10 from a container 11, which may be a forehearth connected to a glass melting tank, not shown. The glass is discharged from the container through an outlet 12 which may be provided with a replaceable orifice ring 13, that may be of any desired size to supply the requisite amount of glass to the receiver. The supply of glass to the outlet may also be regulated by the adjustable gate 14 located in the container near the outlet, as shown in Fig. 2.

The mounting for the table 10 comprises a vertical shaft support 15, which is rotatably mounted in a bearing support 16. Intermittent motion is imparted to the shaft 15 and the table 10 by a ratchet 17 and a pawl 18 that is pivotally connected to one extremity of an actuating arm 19 which is connected to and guided by a radius arm 20 loosely mounted on the shaft 15. The pawl 18 is maintained in contact with the ratchet 17 by a spring 21. The other extremity of the arm 19 is slidably mounted on a pin 22 located at the axis of a cam 23. The arm is reciprocated periodically by the cam 23, acting upon a roller 24 carried by the arm 19 and cooperating with a spring 23$^a$ that is connected between the arm 19 and any convenient stationary support (not shown). The cam shaft 22 is geared to a drive shaft 30 which is rotated from any source of power, indicated by the gear 31.

The outer glass receiving portion of the table 10 is divided into a plurality of sections 25 spaced by radial slots 26 which permit access of suitable shear blades 27 that are operated by bevel gears 28, 28 and a connecting gear 29. The gear 29 is rocked periodically to open and close the shears by means of a cam 29$^a$ secured to the shaft 30 and acting through a lever 29$^b$. Thus the table and the shears are both operated in timed relation by the shaft 30. The table is illustrated as having a flat glass-receiving surface, but it is obvious that this portion of the table may be shaped to aid in receiving and shaping the glass. For example, the glass-receiving surface may be curved as illustrated in Fig. 4.

As the stream of glass is deposited, the support is moved with a periodically varying motion which distributes the glass on the table in charges of periodically varying sizes, as indicated at 32. The arrangement is such that the movement of the table is relatively rapid during the passage of an aperture beneath the discharge outlet 12, thereby causing the deposit to be drawn out to form a relatively thin neck portion 33 of reduced cross sectional area, and the operation of the apparatus is so timed that this small neck portion spans an aperture which readily permits the glass to be severed by the shears 27. The charges thus severed may be delivered to the molds 34 of a glassware shaping machine, a portion of which is shown at 35, by means of a deflector 36 and a chute 37.

In the modified structure shown in Fig. 3, the movable support is shown as an endless conveyor 40 driven by gearing that is adapted to move the conveyor continuously at periodically varying speeds. The surface of the conveyor may be of any desired contour and, as shown, comprises a series of slats 41 having end portions forming an arcuate trough which aids in shaping the mold charges. The slats are mounted upon a link chain construction 42 which is mounted upon suitable sprockets 43, 43. The conveyor is moved at a periodically varying speed and in timed relation with shears 52, so that the glass is attenuated at the spaces between the slats by the periodic acceleration of the conveyor, and the shears pass between the slats 41 at predetermined intervals to sever the deposits of glass into mold charges of the desired size.

The operating mechanism for rotating the conveyor sprockets comprises a differential gear 44 including an internal driving gear 45 which may be driven at a constant speed from any source of power which is indicated by the shaft 50 and the driving gear 51 (Fig. 4). The gear 45 is connected to the gear 44 by an idle gear 46 mounted on a swinging arm 47, one end of which is pivotally mounted on the axis of the gear 44. The other extremity of the arm 47 is pivotally connected to a suitable link mechanism 48, which is operated from any convenient source of power, as for example, a constantly rotating cam 49. Variation in the speed of the gear 44 is obtained by periodically swinging the idle gear 46 around the driving pinion 45, by means of the drive cam 49. The movement of the idle gear about the driving pinion causes the gear 44 to be periodically retarded and accelerated in timed relation with the shear mechanism 52 which may be constructed and operated like the shear mechanism of Figs. 1 and 2.

The structure shown herein may be variously modified within the scope of the appended claims.

I claim as my invention:

1. The method of forming hollow glassware, which comprises depositing a continuous strip of molten glass upon a rectilinearly moving surface and presenting successive portions of the strip to ware forming molds located below the level of said surface.

2. In a method of forming hollow glassware, the steps of flowing glass downwardly in a stream onto a moving support so as to form a continuous strip of molten glass of viscosity suitable for working in ware forming molds, and moving successive portions of said strip downwardly into ware forming molds.

3. In apparatus for forming hollow glassware, a container for molten glass having a discharge outlet, a movable support adapted to receive a continuous deposit of glass from the outlet and to support the same as a continuous strip of glass, said support having spaced apertures provided therein, and means adapted to enter said apertures to separate portions of glass from said strip.

4. The method of feeding molten glass that comprises discharging a continuous deposit of molten glass on an advancing support having a flat supporting surface and periodically varying the cross-sectional area of the said deposit.

5. Apparatus for separating molten glass into mold charges, comprising an advancing glass-receiving support, means for depositing molten glass continuously upon said support, and means for forming said deposit while substantially unconfined on the support into successive portions suitable to serve as mold charges.

6. Apparatus for separating molten glass into mold charges, comprising a container having a discharge outlet, an advancing support adapted to receive a continuous deposit of glass from said outlet without substantially confining the deposited glass, and means for successively severing mold charges from the deposited glass.

7. Apparatus for separating molten glass into mold charges, comprising a container having a discharge outlet, a support adapted to receive a continuous deposit of glass from the outlet, means for moving the support at periodically varying speed to thereby periodically vary the cross sectional area of the deposit, and means for periodically severing mold charges from the deposits on the table.

8. Apparatus for separating molten glass into mold charges, comprising a container having a discharge outlet, a support adapted to receive a continuous deposit of glass from the outlet, said support having spaced apertures provided therein, and means adapted to enter said apertures and to sever mold charges from the glass on the support.

9. Apparatus for separating molten glass into mold charges, comprising a container having a discharge outlet, a movable support adapted to receive a continuous deposit of glass from the outlet, the glass receiving portion of said support being divided into a plurality of spaced sections, and means arranged to pass between the spaced sections for severing mold charges from the glass on the support.

10. Apparatus for separating molten glass into mold charges, comprising a container having a discharge outlet, a conveyor adapted to receive a continuous deposit of glass from the outlet, said conveyor having spaced apertures provided in the glass-receiving portion thereof, means for imparting motion to the conveyor, severing means, and means for operating the severing means, in synchronism with the conveyor, to enter said apertures and to thereby sever mold charges from the glass on the conveyor.

11. Apparatus for separating molten glass into mold charges, comprising a container having a discharge outlet, a support adapted to receive a continuous deposit of glass from the outlet, said support having spaced apertures provided therein, means for periodically varying the cross sectional area of the deposit, the smaller cross section being near an aperture, and means adapted to enter the apertures for severing mold charges from the glass on the support.

12. Apparatus for separating molten glass into mold charges, comprising a container having a submerged outlet, a conveyor adapted to receive a continuous deposit of glass from the outlet, said conveyor having spaced apertures provided in the glass-receiving portion thereof, means for periodically varying the cross sectional area of the deposit, one smaller cross section spanning an aperture, and means passing through the aperture for severing mold charges from the glass on the conveyor.

13. Apparatus for separating molten glass into mold charges, comprising a container having a discharge outlet, a support having a flat surface adapted to receive a continuous deposit of glass from the outlet, means for moving the support at periodically varying speed to cause the formation of deposits of periodically varying cross section, and means for severing the deposit at the smaller cross section to form mold charges of predetermined size.

14. In apparatus for separating molten glass into mold charges, the combination of a container having a submerged discharge outlet, a movable support having a flat surface adapted to receive a continuous deposit of glass from the outlet, means for moving the support at periodically varying speeds to distribute the glass thereon, and means for periodically severing mold charges from the deposit of glass.

15. Glassworking apparatus comprising spaced endless chains, sprockets carrying said chains, a conveyor mounted on said chains, and means for depositing a strip of molten glass upon said conveyor.

16. Glassworking apparatus comprising spaced endless chains, sprockets carrying said chains, a conveyor mounted on said chains, and means for depositing a strip of molten glass upon said conveyor and for periodically varying the cross-section of said stream.

17. Glassworking apparatus comprising spaced endless chains, sprockets carrying said chains, a conveyor mounted on said chains, means for depositing a strip of molten glass upon said conveyor, said conveyor being provided with spaced apertures, and glassworking implements adapted to cooperate with said apertures in working upon said glass.

18. The method of preparing molten glass for fabrication into glassware, which comprises the steps for depositing a strip of molten glass of periodically varying cross-section upon an advancing flat surface and applying glassworking implements to the successive sections of said strips.

19. That improvement in the glass working art which comprises the steps of depositing a strip of molten glass having spaced portions of decreased cross section on a substantially flat moving supporting surface, dividing said stream transversely while on the supporting surface into a series of compact similar separate portions, each adapted to constitute a mold charge, and delivering the respective separate portions successively to separate molds.

20. The method of forming mold charges of molten glass, which comprises discharging molten glass from a supply body in a continuous stream onto a support moving relatively to said supply body, attenuating spaced portions of the stream by periodically increasing and decreasing the speed of movement of the support to preshape successive portions of the discharged glass as deposited on the support, and severing the deposited glass on the support at the places of attenuation to produce a series of mold charges.

21. The method of forming mold charges of molten glass, which comprises discharging molten glass continuously from a supply body, moving the discharged glass while connected with the supply body in the form of a substantially horizontal strip at a periodically varying speed to vary the cross section of portions of glass successively connecting the strip and the supply body and subsequently forming portions of the strip, and periodically dividing the strip transversely into separate portions, each adapted to serve as a mold charge.

22. The method of forming mold charges of molten glass, which comprises supporting and moving in a substantially horizontal plane at a periodically varying speed molten glass issuing from and connected with a supply body of molten glass to produce successive symmetrical portions of glass of varying cross section, each adapted when severed from the remainder of the issued glass to serve as a mold charge, and severing each of said successive portions of glass, when formed, from the remainder of the issued glass.

23. The method of forming mold charges of molten glass, which comprises passing molten glass in a continuous stream through the outlet of a glass container, supporting the issuing glass without confining the stream, moving the support laterally at a speed periodically greater than the normal rate of issuance of the glass stream through the outlet to attenuate spaced portions of the issued glass, and dividing the issued glass at the places of attenuation into separate similar portions, each adapted to serve as a mold charge.

Signed at Hartford, Conn., this 27th day of August, 1925.

KARL E. PEILER.